March 28, 1961 R. E. GOULD 2,976,577

PROCESS OF MAKING FOAM CORED LAMINATES

Filed April 14, 1958

INVENTOR.
Richard E. Gould
BY Edwin L. Dybvig
His Attorney

United States Patent Office 2,976,577
Patented Mar. 28, 1961

2,976,577

PROCESS OF MAKING FOAM CORED LAMINATES

Richard E. Gould, Dayton, Ohio, assignor to General Motors Corporation, Detroit, Mich., a corporation of Delaware Filed Apr. 14, 1958, Ser. No. 728,440

2 Claims. (Cl. 18—59)

This invention relates generally to a process of making foam cored laminates and particularly to a process of making laminated and foam cored refrigerator cabinet doors and similar parts from plastic sheet or sheets and plastic foam.

In the formation of articles from plastic sheet or sheets and foam, it is customary to heat the plastic sheet or sheets in an oven and then to transfer the sheet or sheets to a mold or molds wherein the sheet is, or the sheets are, vacuum formed or otherwise shaped while still above the softening point. After this formation and cooling, the sheet or sheets are then transferred to another mold and foam forming materials introduced to fill with foamed plastic the spaces between the sheet or sheets.

It is an object of this invention to provide an arrangement wherein the forming of the sheet or sheets and the foaming operation can be done in a single step in a single mold to eliminate the need for an oven and vacuum forming apparatus as well as the need for the separate heating and vacuum forming and cooling steps.

It is another object of this invention to employ the exothermic heat and the pressure generated during foaming by the foam forming materials as a substitute for the oven heating and vacuum forming to heat and form into the desired shape the plastic sheet or sheets in a single combined forming and foaming step.

These and other objects are attained in the forms shown in the drawings in which the foam forming materials are introduced between two unformed sheets before the mold surrounding the sheets is closed. The foam forming materials as the form is formed generate sufficient heat to first soften and begin the forming of the lower sheet and then to expand and soften the upper sheet with a continuing generation of pressure until both sheets have been pressed against the walls of the mold to form the completed structure of plastic sheet and plastic foam. In a second form of the invention, one of the plastic sheets may be preformed after which the foam forming materials are introduced and a second unformed sheet is applied and softened and pressed against the walls of the mold by the foam forming materials in the formation of the foam.

Further objects and advantages of the present invention will be apparent from the following description, reference being had to the accompanying drawings wherein a preferred embodiment of the present invention is clearly shown.

Figure 1:
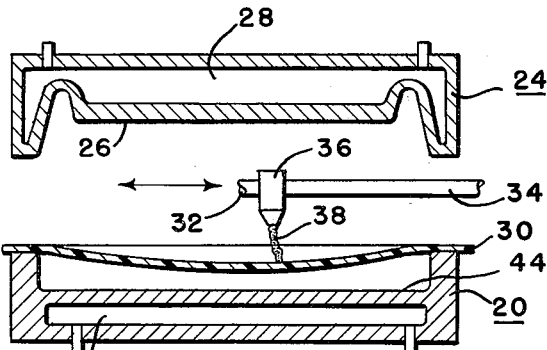
Figure 1 is a diagrammatic sectional view illustrating the molds and the application of the foam forming materials to the sheet in the molds.

Referring now to the drawing and more particularly to Fig. 1, there is shown for the purpose of illustrating this invention a lower mold 20 which may be provided with passages 22 therein for introducing liquids, vapors or gases for the purpose of controlling the temperature of the mold. However, the mold may be made of such materials and such suitable mass and thickness that no such temperature regulation is necessary. The mold 20 may have its inner surface 44 shaped to produce the outer surface of a refrigerator door or the outer surface of any desired article.

An upper mold 24 is provided or suspended above the low mold 20. It has its inner surface or contour 26 shaped to form the inner surface of a refrigerator door. However, this surface of this mold may be shaped to form any desired article. The mold 24 may also have passages 28 therein through which may circulate liquids, vapors or gases for the purpose of regulating its temperature. However, with the proper mass, thickness and type of materials, this temperature regulation may be unnecessary.

In beginning the formation, an unformed, substantially flat thermoplastic resin sheet 30 is laid over the bottom mold. This plastic sheet preferably is a single composite sheet having an elastomeric core or inner layer of a copolymer of butadiene and styrene which has adhered to its surface layers of a copolymer of vinyl material and acrylonitrile. This composite sheet can be made in various colors and has a good color retention. It has good resistance to wear and scratching and is capable of being deep-drawn. It has good resistance to aging, good bonding properties, and forms a good surface material. It may be used in various thicknesses, for example, 99/1000". However, other thermoplastic sheets such as polystyrene sheets in thicknesses of 40 to 125/1000", polyvinyl chloride, polyvinyl acetate and vinyl copolymer sheets may also be used, preferably in the thicknesses of 40 to 90/1000". Also, cellulose acetate sheets are usable.

Figure 2:
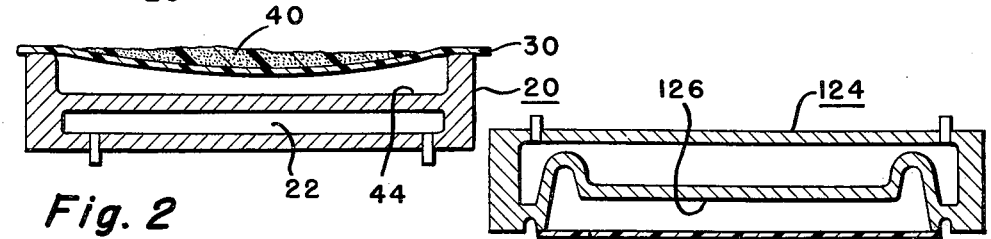
Figure 2 is a diagrammatic view of the molds, the sheets and the foam forming materials just prior to the closing of the molds.
Figure 5:
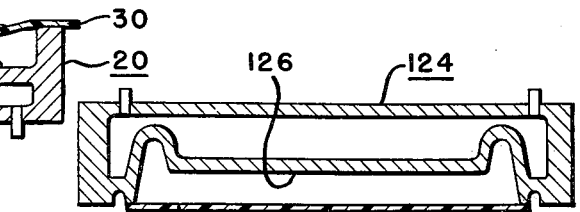
Figure 5 is a diagrammatic sectional view illustrating a modified form of the process in which the lower sheet is preformed.
Figure 3:
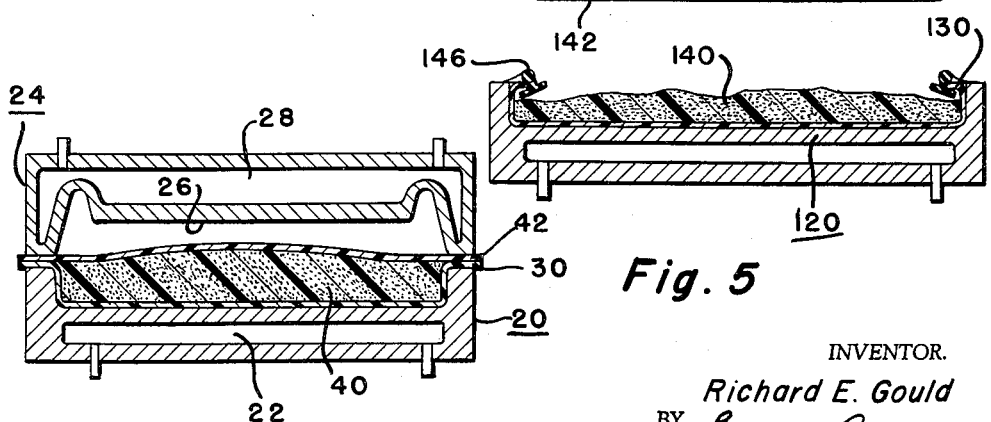
Figure 3 is a diagrammatic sectional view of the molds and the plastic sheet and form at an intermediate state of the foaming operation.

After this, the liquid foam forming materials are introduced onto the sheet 30. This may be done by piping through two pipes 32 and 34 the foam forming materials to a mixing device 36 from which the mixed foam forming materials issue and are flowed on, as indicated by the reference character 38. A specific example of foam forming materials is as follows:

An ethylene glycol-adipic acid polyester was prepared having a hydroxyl number of about 430, an acid number of about 1.50 and a negligible water content. A portion of the polyester was reacted with toluene diisocyanate to produce an isocyanate modified polyester having an isocyanate equivalent of about .80 per 100 grams of the isocyanate modified polyester. A liquid mixture of 100 parts by weight of the above mentioned isocyanate modified polyester, .50 part by weight of polyoxyethylene sorbitan monopalmitate emulsifier, and 30 parts by weight of trichloromonofluoromethane (F11) was placed in a tank and kept cool, such as below 50° F. A liquid mixture of 60 parts by weight of the ethylene glycol-adipic acid polyester, 12 parts by weight of ethylene glycol, and .25 part by weight of dimethyl ethanolamine and .25 part by weight of polyoxyethylene sorbitan monopalmitate emulsifier was placed in another tank. The unpolymerized liquid components from the two tanks are supplied separately through two pipes 32 and 34 to the mixing device 36 at a ratio of 130.50 parts by weight of the former to 72.50 parts by weight of the latter and discharged as a liquid from the mixing device 36 onto the plastic sheet 30, as shown, until a sufficient amount of the material 40, as shown in Fig. 2, is applied to the sheet 30. A top sheet 42 is then provided over the material 40. This top sheet may be of the same or different material as the bottom sheet 30 but in any case, must be a thermoplastic material of one of the types listed in connection with the sheet 30 or the equivalents thereof. The upper mold 24 is then closed down onto the lower mold 20 with the edges of the sheets 30 and 42 held firmly between the edges of the molds.

Figure 4:
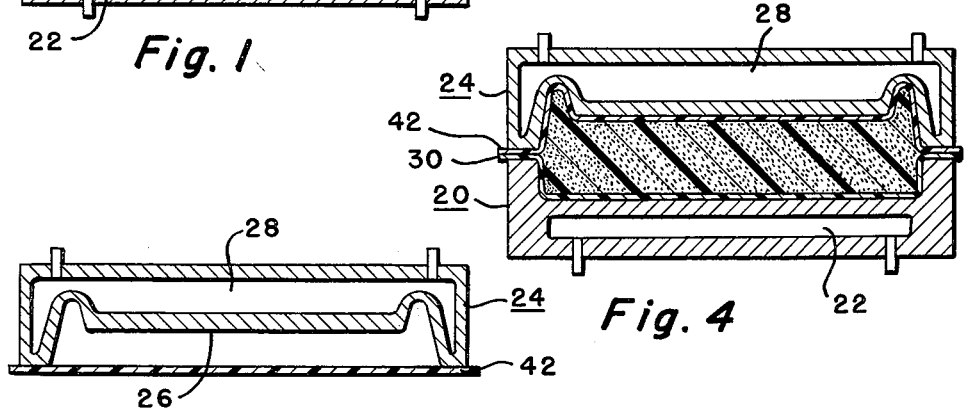
Figure 4 is a diagrammatic sectional view of the molds and the plastic sheet and foam at the conclusion of the foaming operation.

In about two minutes, the temperature of the reacting mixture 40 will rise to about 250° F. thereby first softening the lower sheet 30 and causing it to begin to assume the shape of the interior surface 44 of the lower mold 20. As the foam forming materials 40 expand, they will also contact and heat the upper sheet 42. The upper sheet 42 will then also soften. The foam forming materials will also begin to form foam which will generate a pressure spreading the sheets 30 and 42 away from each other and gradually forcing them more and more into contact with the adjacent surfaces 44 and 26 of the lower and upper molds 20 and 24 until the entire mold cavity is filled, as shown in Fig. 4. If exactly the right amount of foam forming material has been provided, there will be no need for any escape holes in either the sheets or the molds. However, such escape holes may be provided as are found necessary in practice if an excessive amount has been introduced. After the reaction has been completed and the sheets, foam material and the mold have been cooled, the mold can be opened and the completed door member can be removed.

Instead of the specific foam forming materials set forth above, other foam forming materials may be used such as polyurethane foams as set forth in Patents Nos. 2,557,279, 2,557,280 and 2,557,281, issued December 4, 1951, 2,591,884, issued April 8, 1952, 2,690,987 issued October 5, 1954, 2,698,838, issued January 4, 1955 and 2,706,311, issued April 19, 1955. Also, phenol formaldehyde foam forming materials such as are disclosed in Patent 2,446,429, issued August 3, 1948 are usable as well as polyethylene foam forming materials and epoxy resins containing polystrene beads.

In the second form of the invention, a preformed lower sheet 130 is provided in the shape of the outer surface of a refrigerator door, for example. This sheet may have inturned flanges. This sheet 130 may be of the same type as specified for the sheet 30 but is not necessarily limited thereto. In this process, foam forming materials 140 of the same type as specified above are introduced onto the interior of the sheet 130 in a manner similar to that previously described. An upper sheet 142, preferably of the same materials set forth for the sheet 30, is then placed over the lower sheet. If desired, an elastomeric seal 146 may be held in place so that when the mold is closed, it is held between the edges of the upper and lower sheets 142 and 130. The upper mold 124 is then brought down upon the lower mold 120 in such a way that the elastomeric seal 146 is held between the edges of the sheets 142 and 130.

The foaming of the foam forming materials 140 then proceeds and contacts the upper sheet 142. The heat of the reaction softens the sheet 142 and the pressure generated by the foam forming materials presses the sheet 142 upwardly until it contacts the inner surface 126 throughout the upper mold. If the exact amount of foam forming materials required has been introduced, they will substantially fill the interior space without any appreciable excess. The sheet 142 will be pressed upwardly substantially to the position shown in Fig. 4. When the foaming operation is completed and the upper and lower molds 120 and 124 are cooled, the completed article may be removed. Where no surface sheet is necessary, the lower sheet 130 can be omitted if the interior surface of the mold 120 is provided with a suitable parting agent. In this case, the sheet 142 is provided with a foamed backing.

Most of the foams mentioned provide excellent insulating properties and therefore the articles formed are especially suitable for refrigerator cabinets and especially refrigerator doors. However, they are also useful where the insulating requirements are less or even nonexistent. The articles are relatively lightweight and strong. They may be either rigid or resilient in accordance with the particular materials chosen.

While the embodiment of the present invention as herein disclosed constitutes a preferred form, it is to be understood that other forms might be adopted.

What is claimed is as follows:

1. The process of making an article having foamed material provided with a surface of a plastic resin sheet comprising the steps of confining on one side of an unformed thermoplastic resin sheet requiring heat to soften and render it conformable, a sufficient amount of liquid unpolymerized foam forming materials capable of reacting exothermically to produce heat sufficient to soften and render the sheet conformable and to expand sufficiently to push the sheet toward the opposite side, and permitting the foam forming materials to react and expand whereby the thermoplastic resin sheet becomes softened sufficiently to render it conformable by the heat developed and the expansion pressure pushes the sheet while softened to the opposite side, and confining and regulating the temperature of substantially the entire surface of the opposite side of said sheet in the contour desired during such softening and expansion of the sheet and also during the cooling of the sheet to achieve the desired contour, said expansion pressure being sufficient to push said sheet to the limits of confinement.

2. The process of making an article containing a foamed material comprising the steps of forming a first sheet to provide a space within the sheet, introducing into said space within the sheet liquid unpolymerized foam forming materials capable of reacting exothermically to expand into a foam material, applying a second unformed sheet of thermoplastic resin material to the first sheet, and during the exothermic reaction holding the peripheral edges of such sheets in sealing contact and confining and regulating the temperature of substantially the entire surface of the opposite side of said second sheet during the reaction and the cooling following the completion of the reaction to achieve the contour desired, and permitting the foam forming materials to react and expand whereby the second sheet becomes softened by the heat developed and the expansion pressure moves the second sheet while softened away from the first sheet to fill the space between them to achieve the contour desired, said second sheet requiring heat to soften it and render it conformable, said liquid foam forming materials being sufficient in amount to produce heat sufficient to soften said second sheet to a plastic conformable condition and to produce sufficient expansion pressure to move said second sheet when softened away from the first sheet to the limits of confinement.

References Cited in the file of this patent

UNITED STATES PATENTS

| | | |
|---|---|---|
| 2,319,042 | De Wyke | May 11, 1943 |
| 2,753,642 | Sullivan | July 10, 1956 |
| 2,891,288 | Daley | June 23, 1959 |
| 2,898,626 | Alderfer et al. | Aug. 11, 1959 |
| 2,898,634 | Alderfer | Aug. 11, 1959 |